US012169048B2

(12) United States Patent
Lin et al.

(10) Patent No.: US 12,169,048 B2
(45) Date of Patent: Dec. 17, 2024

(54) LINEAR LIGHT APPARATUS

(71) Applicant: XIAMEN LEEDARSON LIGHTING CO., LTD, Fujian (CN)

(72) Inventors: Junjie Lin, Fujian (CN); Shaomei Liang, Fujian (CN); Lei Zhang, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/334,368

(22) Filed: May 28, 2021

(65) Prior Publication Data

US 2021/0372578 A1 Dec. 2, 2021

(30) Foreign Application Priority Data

May 28, 2020 (CN) ......................... 202020937569.1

(51) Int. Cl.

| | |
|---|---|
| ***F21S 4/28*** | (2016.01) |
| ***F21V 17/16*** | (2006.01) |
| ***F21V 23/06*** | (2006.01) |
| ***F21V 29/83*** | (2015.01) |
| *F21Y 103/10* | (2016.01) |
| *F21Y 115/10* | (2016.01) |

(52) U.S. Cl.

CPC .............. *F21S 4/28* (2016.01); *F21V 17/164* (2013.01); *F21V 23/06* (2013.01); *F21V 29/83* (2015.01); *F21Y 2103/10* (2016.08); *F21Y 2115/10* (2016.08)

(58) Field of Classification Search

CPC .......... F21S 4/28; F21V 29/83; F21V 17/164; F21V 23/06; F21Y 2103/10

See application file for complete search history.

(56) References Cited

U.S. PATENT DOCUMENTS

| | | | | |
|---|---|---|---|---|
| 2012/0217882 A1* | 8/2012 | Wong | .................. | H05B 47/115 315/312 |
| 2016/0356454 A1* | 12/2016 | Camarota | ............ | F21V 21/005 |
| 2021/0372577 A1* | 12/2021 | Lin | ....................... | F21V 17/104 |
| 2021/0372598 A1* | 12/2021 | Lin | .................... | F21V 19/0015 |

FOREIGN PATENT DOCUMENTS

| | | | | |
|---|---|---|---|---|
| CN | 106461196 A * | 2/2017 | ............ | F21K 9/272 |
| CN | 214094147 U * | 8/2021 | | |
| ES | 2856977 T3 * | 9/2021 | ............... | F21K 9/20 |

* cited by examiner

*Primary Examiner* — Anabel Ton

(74) *Attorney, Agent, or Firm* — Chun-Ming Shih; LANWAY IPR SERVICES

(57) ABSTRACT

A linear light apparatus includes a light strip, a main bracket, two end covers and a bottom holder. The light passing cover has two side arc openings and two lateral bottom edges. The two lateral bottom edges of the light passing cover are respectively attached to two lateral walls of the main bracket. The ladder groove has a central surface and two tilt surfaces. The two tilt surfaces respectively extend from top edges of the two lateral walls to lower the central surface below a bottom line of the side arc opening. The two end covers respectively have a top part and a bottom part. The top parts of the two end covers respectively cover the arc openings of the light passing cover. The bottom parts of the two end covers respectively cover the lateral groove.

20 Claims, 9 Drawing Sheets

LINEAR LIGHT APPARATUS

FIELD

The present invention is related to a linear light apparatus, and more particularly related to a linear light apparatus with a compact design.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

In past, light tubes are widely used for direct or indirect illuminance devices. It meets new challenge when applying the light tube structures in LED technologies.

It is beneficial to design a compact linear light that can replace traditional light tubes while keeping low cost and considering heat dissipation. In past, light tubes are widely used for direct or indirect illuminance devices. It meets new challenge when applying the light tube structures in LED technologies.

It is beneficial to design a compact linear light that can replace traditional light tubes while keeping low cost and considering heat dissipation. In past, light tubes are widely used for direct or indirect illuminance devices. It meets new challenge when applying the light tube structures in LED technologies.

It is beneficial to design a compact linear light that can replace traditional light tubes while keeping low cost and considering heat dissipation. In past, light tubes are widely used for direct or indirect illuminance devices. It meets new challenge when applying the light tube structures in LED technologies.

It is beneficial to design a compact linear light that can replace traditional light tubes while keeping low cost and considering heat dissipation.

SUMMARY

In some embodiments, a linear light apparatus includes a light strip, a main bracket, two end covers and a bottom holder.

The light strip has an elongated substrate mounted with LED modules.

The light passing cover has two side arc openings and two lateral bottom edges.

The two lateral bottom edges of the light passing cover are respectively attached to two lateral walls of the main bracket.

The ladder groove has a central surface and two tilt surfaces.

The two tilt surfaces respectively extend from top edges of the two lateral walls to lower the central surface below a bottom line of the side arc opening.

The central surface is used for mounting the light strip.

The two end covers respectively have a top part and a bottom part.

The top parts of the two end covers respectively cover the arc openings of the light passing cover. The bottom parts of the two end covers respectively cover the lateral groove.

The bottom holder is attached to the two lateral walls of the main bracket.

The bottom holder has two block plates on two opposite sides of the bottom holder.

The bottom part of the end cover is kept between the block plate and the main bracket.

In some embodiments, the bottom part of the end cover has a rib unit inserted into a receiver unit of the main bracket to position and to attach the end cover to the main bracket.

In some embodiments, the rib unit has multiple protruding strips sliding into tracks of the receiver unit of the main bracket.

In some embodiments, the light strip is inserted to the central surface of the main bracket via the track of the main bracket.

In some embodiments, the protruding strips are supported by reinforcing ribs.

The reinforcing ribs are perpendicular to the top part of the end cover.

In some embodiments, the reinforcing rib is a triangular structure.

In some embodiments, the protruding strips are on a protruding plate.

The protruding plate is perpendicular to the reinforcing ribs.

In some embodiments, a top edge of the block plate engages a bottom edge of the top part of the end cover.

In some embodiments, one block plate has a socket for connecting to an external power source.

In some embodiments, another socket of the other block cover is used for inserting an extension module. The extension module has a circuit for extending a function of a driver providing a driving current of the light strip.

In some embodiments, the block only engages the bottom part of the end cover, not engages the top part of the end cover.

In some embodiments, the bottom holder has two side walls.

The side wall has a first buckle unit for attaching to a second buckle unit of the lateral wall of the main bracket.

In some embodiments, the main bracket is made by bending a metal plate.

In some embodiments, the second buckle unit is a bent edge of the metal plate.

In some embodiments, the top part of the end cover has a peripheral groove for aligning and inserting an arc edge of the light passing cover.

The art edge defines the arc opening.

In some embodiments, the linear light apparatus may also include a driver disposed in a driver space enclosed by the main bracket and the bottom holder.

In some embodiments, the block plate is a made by folding an edge part of the bottom holder.

In some embodiments, the tilt surfaces have reflective layers for reflecting a light of the light strip to the light passing cover.

In some embodiments, the tilt surfaces are mounted with an additional light source.

The additional light source has a different optical parameter from the LED modules on the light strip.

In some embodiments, the bottom holder has an air flow channel for heat dissipation.

DETAILED DESCRIPTION

Figure 9:
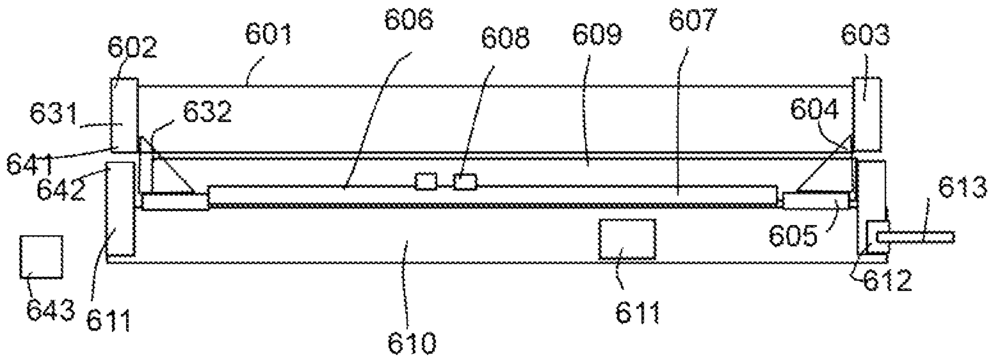
FIG. 9 illustrates another linear light apparatus.
Figure 10:
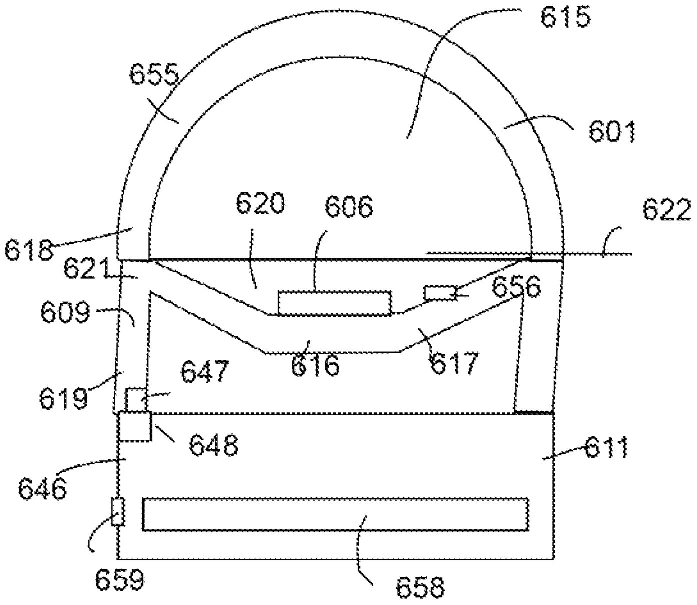
FIG. 10 illustrates another view of the embodiment in FIG. 9.

Please refer to FIG. 9 and FIG. 10, which illustrates an embodiment in two views. The same reference numerals among drawings refer to the same components and would not be repeated again for brevity.

In FIG. 9, a linear light apparatus includes a light strip 606, a main bracket 609, two end covers 602 and a bottom holder 610.

The light strip 606 has an elongated substrate 607 mounted with LED modules 608.

The light passing cover 601 has two side arc openings 615 and two lateral bottom edges 618.

The two lateral bottom edges 618 of the light passing cover 601 are respectively attached to two lateral walls 619 of the main bracket 609.

The ladder groove 620 has a central surface 616 and two tilt surfaces 617.

The two tilt surfaces 617 respectively extend from top edges 621 of the two lateral walls 619 to lower the central surface 616 below a bottom line 622 of the side arc opening 615.

The central surface 616 is used for mounting the light strip 606.

The two end covers 602 respectively have a top part 631 and a bottom part 632.

The top parts 631 of the two end covers respectively cover the arc openings 615 of the light passing cover 601. The bottom parts 632 of the two end covers 602 respectively cover the lateral groove 620.

The bottom holder 610 is attached to the two lateral walls 619 of the main bracket 609.

The bottom holder 610 has two block plates 611 on two opposite sides of the bottom holder 610.

The bottom part 632 of the end cover 602 is kept between the block plate 611 and the main bracket 609.

Figure 6A:
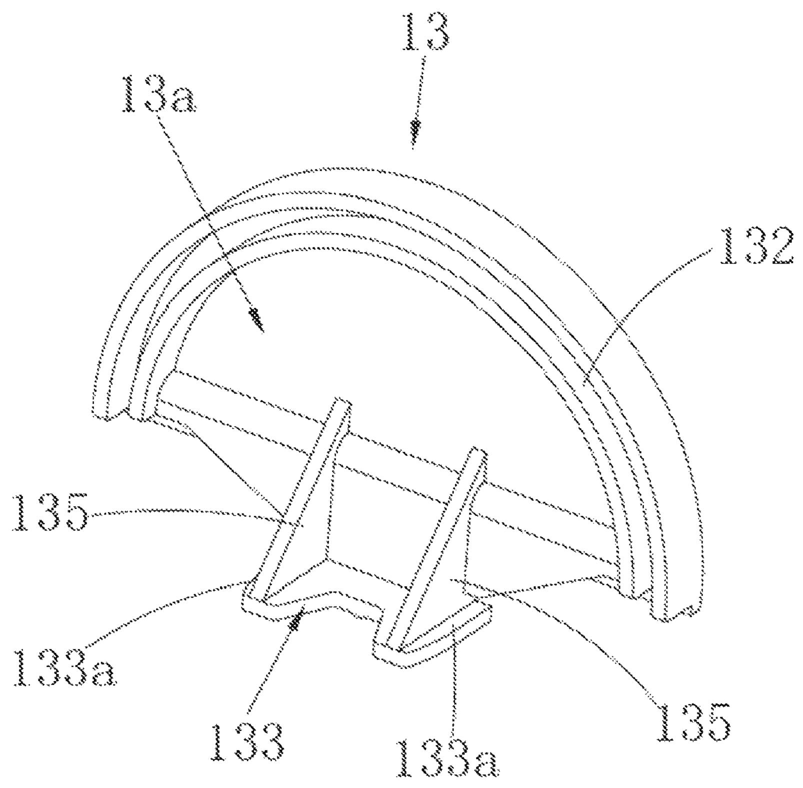
FIG. 6A illustrates a first view of a end cover example.
Figure 6B:
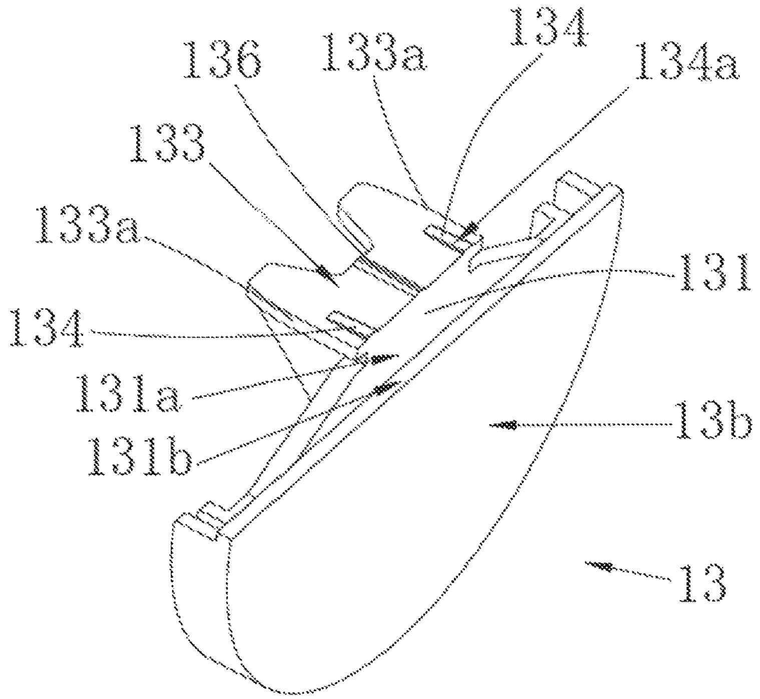
FIG. 6B illustrates another view of the end cover example in FIG. 6A.

FIG. 6A and FIG. 6B show an example of an end cover. In FIG. 6A and FIG. 6B, the bottom part of the end cover has a rib unit 133 inserted into a receiver unit of the main bracket to position and to attach the end cover to the main bracket.

Figure 5:
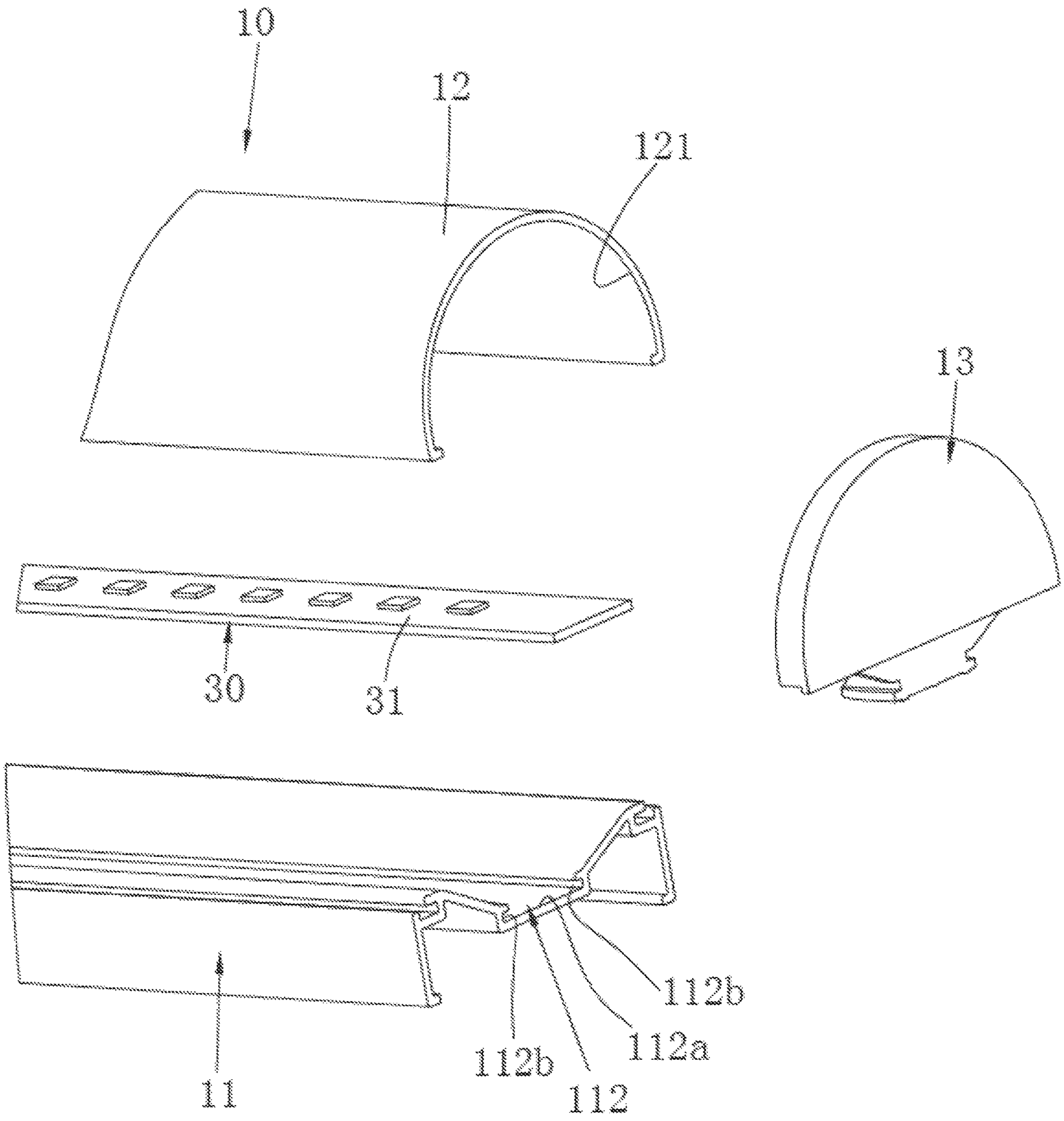
FIG. 5 illustrates an exploded view of a portion of the example in FIG. 1.

FIG. 5 shows a main bracket example. In FIG. 5, there is a track 112 for inserting the light strip and also as the receiver unit mentioned above for inserting rib unit 133 in FIG. 5.

In FIG. 6A and FIG. 6B, the rib unit 133 has multiple protruding strips 133*a* sliding into tracks of the receiver unit of the main bracket.

In some embodiments, the light strip is inserted to the central surface of the main bracket via the track of the main bracket, as explained above.

In FIG. 6A and FIG. 6B, the protruding strips are supported by reinforcing ribs 135.

The reinforcing ribs 135 are perpendicular to the top part 13*a* of the end cover 13.

In FIG. 6A and FIG. 6B, the reinforcing rib 135 is a triangular structure.

In some embodiments, the protruding strips are on a protruding plate, as illustrated in FIG. 6A and FIG. 6B.

The protruding plate of the rib unit 133 is perpendicular to the reinforcing ribs 135.

In some embodiments, a top edge 642 of the block plate 611 engages a bottom edge 641 of the top part 631 of the end cover 602.

In some embodiments, one block plate has a socket 612 for connecting to an external power source 613.

In some embodiments, another socket of the other block cover is used for inserting an extension module 643. The extension module 643 has a circuit, e.g. a wireless circuit, for extending a function of a driver 611 providing a driving current of the light strip 606.

In some embodiments, the block plate only engages the bottom part of the end cover, not engages the top part of the end cover, as illustrated in FIG. 9.

In FIG. 9 and FIG. 10, the bottom holder has two side walls 646.

The side wall 646 has a first buckle unit 648 for attaching to a second buckle unit 647 of the lateral wall 619 of the main bracket 609.

In some embodiments, the main bracket 609 is made by bending a metal plate.

Figure 7:
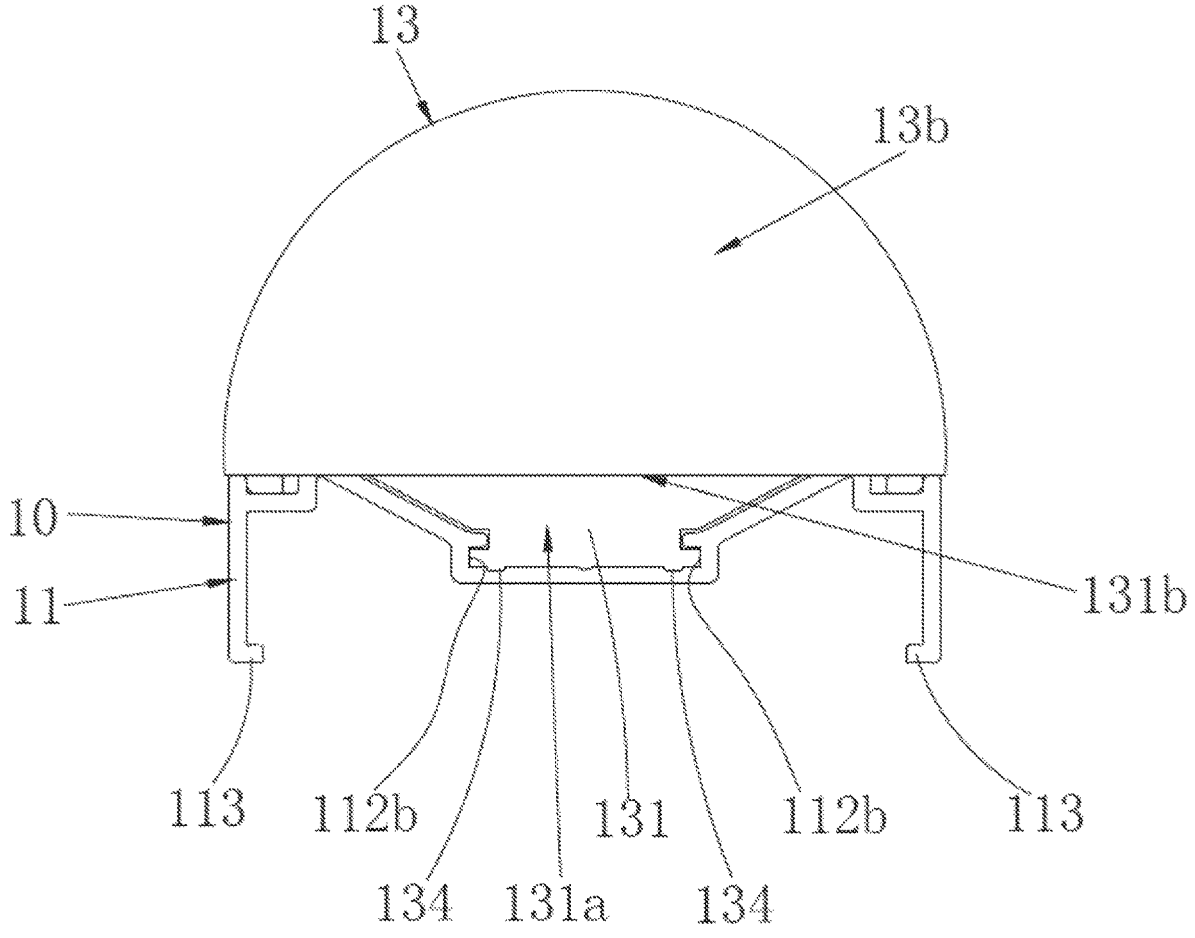
FIG. 7 illustrates a side view of the example in FIG. 1.

In some embodiments, the second buckle unit is a bent edge of the metal plate. An example is illustrated in FIG. 7.

In FIG. 6A, the top part of the end cover has a peripheral groove 132 for aligning and inserting an arc edge of the light passing cover.

In FIG. 10, the art edge 655 defines the arc opening 615.

In some embodiments, the linear light apparatus may also include a driver disposed in a driver space enclosed by the main bracket and the bottom holder.

In some embodiments, the block plate is a made by folding an edge part of the bottom holder.

In some embodiments, the tilt surfaces have reflective layers for reflecting a light of the light strip to the light passing cover. For example, a reflective film or painting may be applied or attached on the tilt surfaces.

In FIG. 10, the tilt surfaces are mounted with an additional light source 656.

The additional light source has a different optical parameter from the LED modules on the light strip.

In some embodiments, the bottom holder has an air flow channel 658 for heat dissipation, e.g. to carry heated air to an air passage 659.

Please refer to FIG. 1 to FIG. 8, which illustrates another detailed example. The same reference numerals refer to the same components among drawings.

Figure 1:
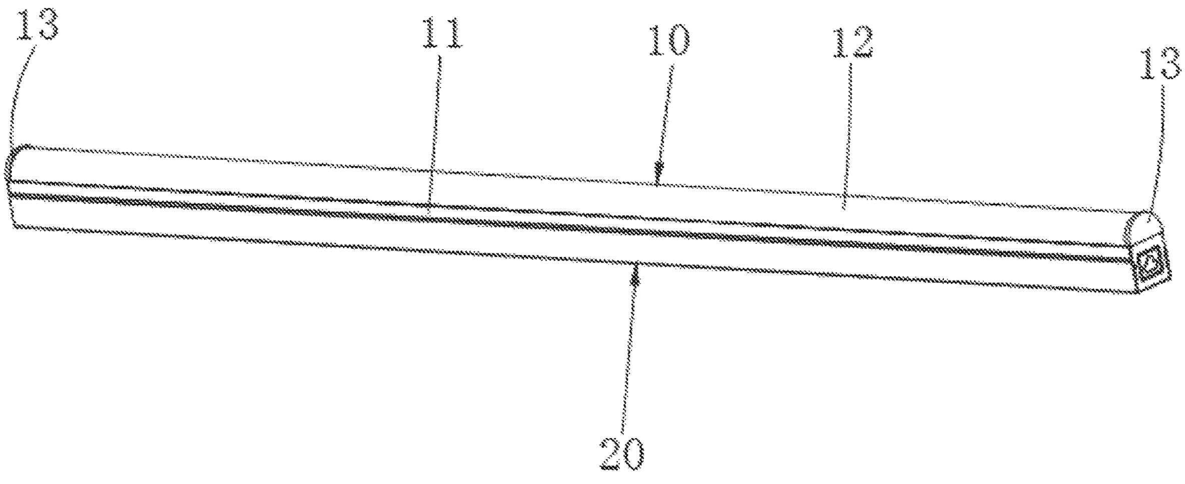
FIG. 1 illustrates a linear light apparatus embodiment.

In FIG. 1, the linear light apparatus 10 has a main bracket 11, a bottom holder 20, end covers 13, a light passing cover 12.

Figure 2:
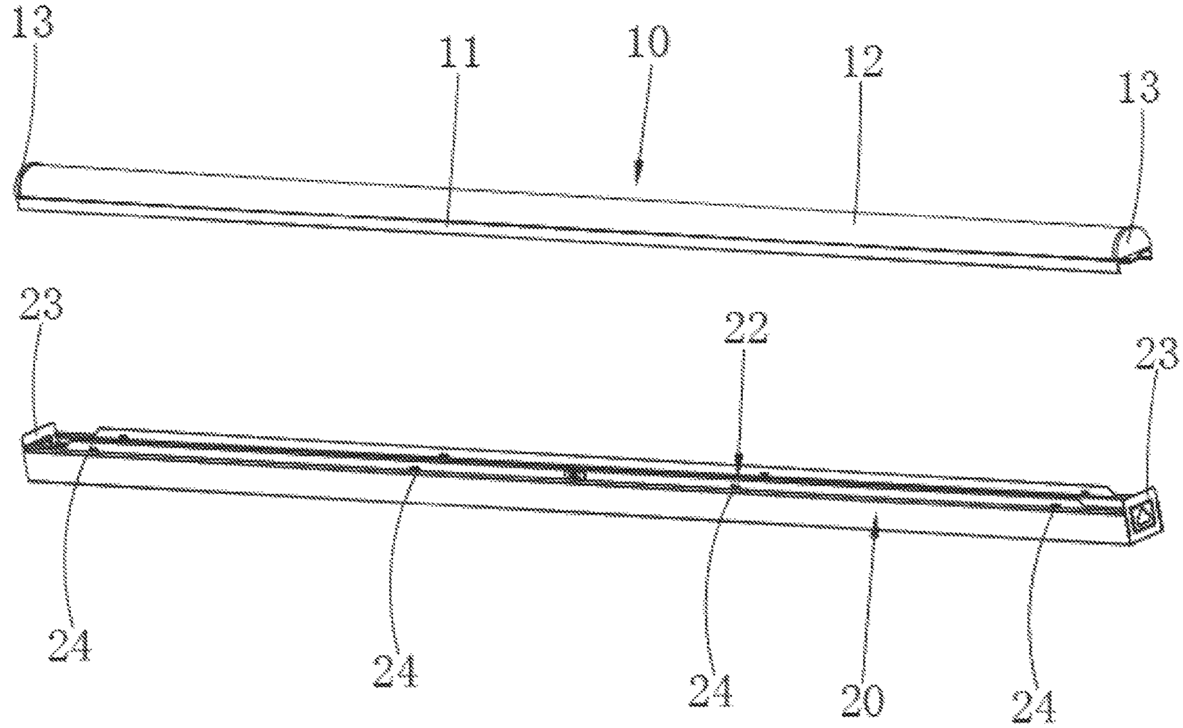
FIG. 2 illustrates an exploded view of the example in FIG. 1.

FIG. 2 shows an exploded view of the example in FIG. 1. In addition to the components mentioned above, the bottom holder 20 has multiple first buckle units 24. The bottom holder 20 has two block plates 23 on two opposite sides.

Figure 3:
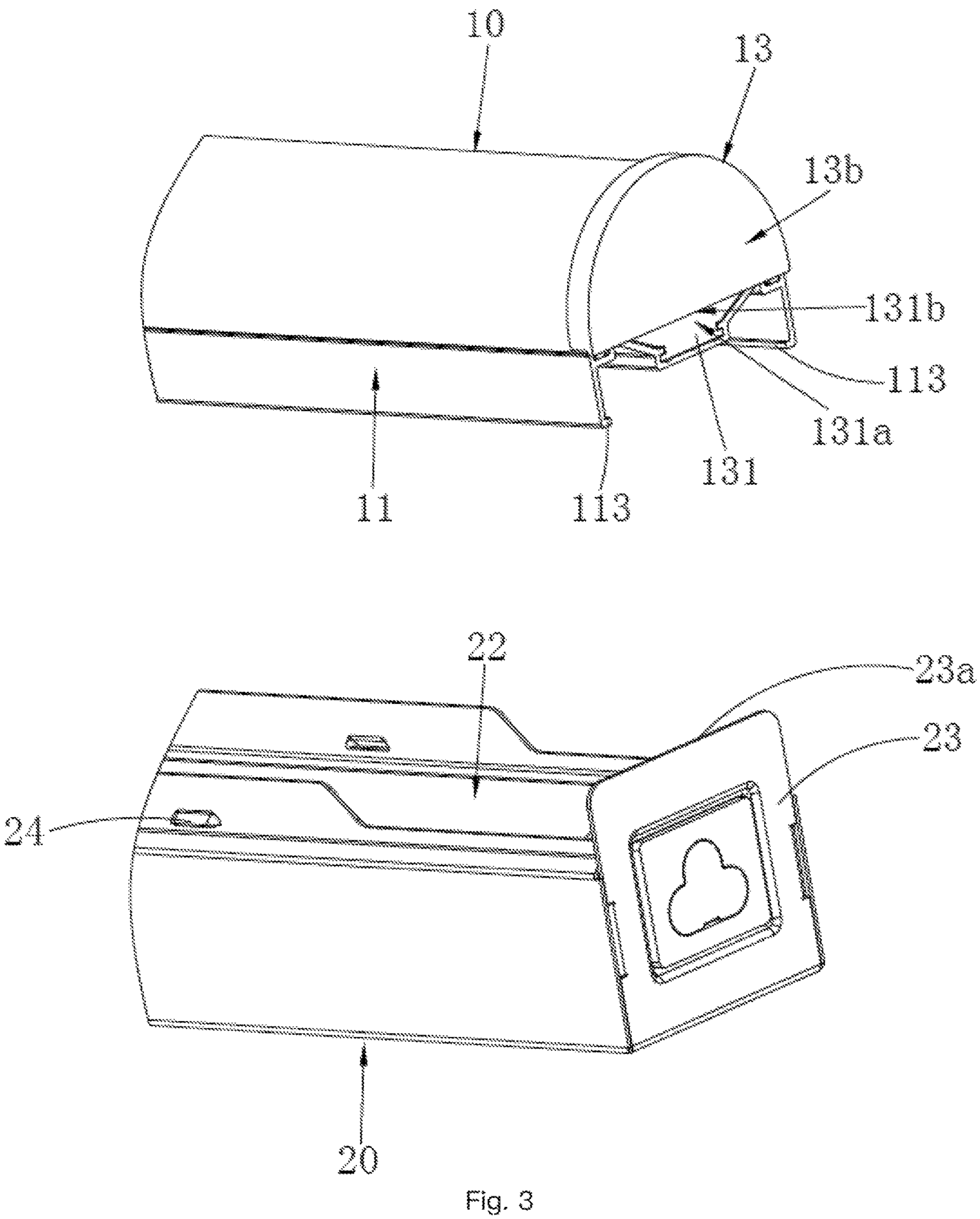
FIG. 3 illustrates a zoom-up view of a portion of the example in FIG. 2.

FIG. 3 shows a zoom-up view of the example in FIG. 2. There is a ladder groove 131 with two tilt surfaces 131*b* connecting on two sides of a central surface 131*a*. The main bracket 11 has second buckle units 113 to be buckled to the first buckle units 24 of the bottom holder 20. The main bracket 11 is inserted to the bottom holder 20 toward the installation cavity 22.

Figure 4:
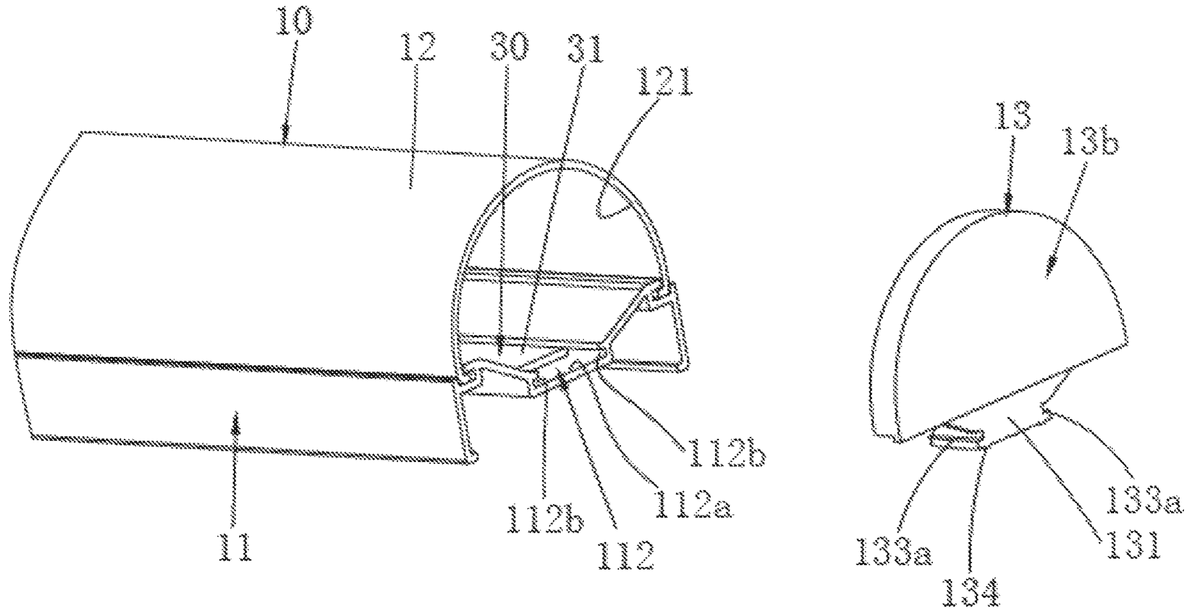
FIG. 4 illustrates another zoom-up view of a portion of the example in FIG. 2.

FIG. 4 illustrates another zoom-up view of the example.

In FIG. 4, the end cover 13 has a top part 13*b* and a bottom part 133*a*. The rib strip 133*a* is inserted to a track 112*b* of a ladder groove 112. The light strip 30 with an elongated substrate 31 is also sliding via the track 112*b* to be mounted on the ladder groove 112.

FIG. 5 shows the light passing cover 12 defining an arc opening 121 concealed by the end cover 13. The light strip 30 has an elongated substrate 31 mounted with LED modules.

FIG. 6A and FIG. 6B show a detailed example of an end cover, which is explained above.

FIG. 7 shows the light passing cover is integrated with the end cover and the main bracket.

Figure 8:
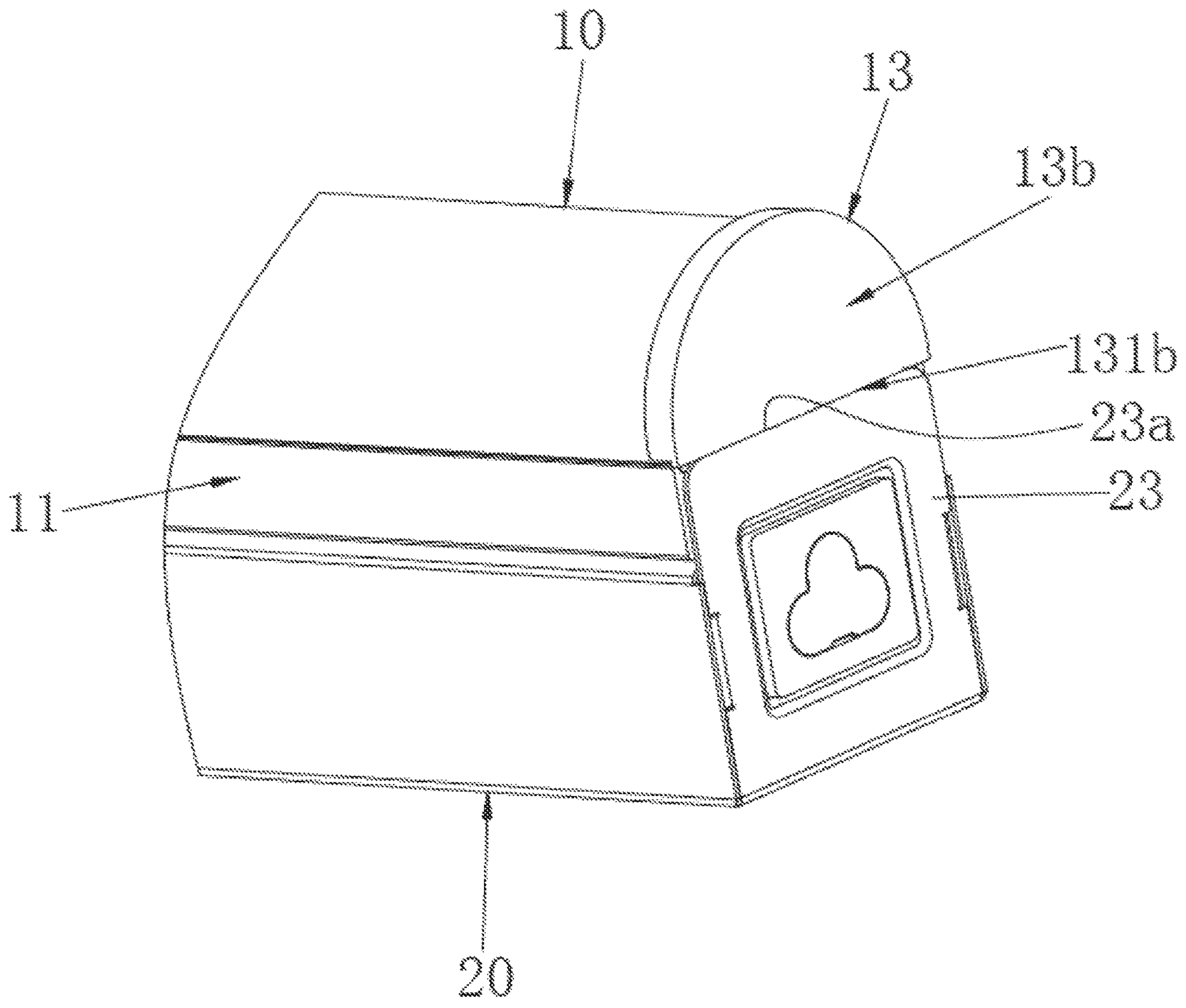
FIG. 8 illustrates a zoom-up view of a lateral side of the example in FIG. 1.

FIG. 8 shows the component in FIG. 7 is further integrated with the bottom holder 20.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A linear light apparatus, comprising:

a light strip having an elongated substrate mounted with LED modules;

a light passing cover, wherein the light passing cover has two side arc openings and two lateral bottom edges;

a main bracket, wherein the two lateral bottom edges of the light passing cover are respectively attached to two lateral walls of the main bracket, wherein a ladder groove of the main bracket has a central surface and two tilt surfaces, wherein the two tilt surfaces respectively extend from top edges of the two lateral walls to lower the central surface below a bottom line of the side arc opening, wherein the central surface is used for mounting the light strip;

two end covers, wherein the two end covers respectively have a top part and a bottom part, wherein the top parts of the two end covers respectively cover the arc openings of the light passing cover, the bottom parts of the two end covers respectively covers the lateral groove; and a bottom holder for attaching to the two lateral walls of the main bracket, wherein the bottom holder has two block plates on two opposite sides of the bottom holder, wherein the bottom part of the end cover is kept between the block plate and the main bracket.

2. The linear light apparatus of claim 1, wherein the bottom part of the end cover has a rib unit inserted into a receiver unit of the main bracket to position and to attach the end cover to the main bracket.

3. The linear light apparatus of claim 2, wherein the rib unit has multiple protruding strips sliding into tracks of the receiver unit of the main bracket.

4. The linear light apparatus of claim 3, wherein the light strip is inserted to the central surface of the main bracket via the track of the main bracket.

5. The linear light apparatus of claim 3, wherein the protruding strips are supported by reinforcing ribs, wherein the reinforcing ribs are perpendicular to the top part of the end cover.

6. The linear light apparatus of claim 5, wherein the reinforcing rib is a triangular structure.

7. The linear light apparatus of claim 5, wherein the protruding strips are on a protruding plate, the protruding plate is perpendicular to the reinforcing ribs.

8. The linear light apparatus of claim 5, wherein a top edge of the block plate engages a bottom edge of the top part of the end cover.

9. The linear light apparatus of claim 1, wherein one block plate has a socket for connecting to an external power source.

10. The linear light apparatus of claim 9, wherein another socket of the other block plate is used for inserting an extension module, the extension module has a circuit for extending a function of a driver providing a driving current of the light strip.

11. The linear light apparatus of claim 1, wherein the block plate only engages the bottom part of the end cover, not engages the top part of the end cover.

12. The linear light apparatus of claim 1, wherein the bottom holder has two side walls, wherein the side wall has a first buckle unit for attaching to a second buckle unit of the lateral wall of the main bracket.

13. The linear light apparatus of claim 12, wherein the main bracket is made by bending a metal plate.

14. The linear light apparatus of claim 13, wherein the second buckle unit is a bent edge of the metal plate.

15. The linear light apparatus of claim 1, wherein the top part of the end cover has a peripheral groove for aligning and inserting an arc edge of the light passing cover, wherein the art edge defines the arc opening.

16. The linear light apparatus of claim 1, further comprising a driver disposed in a driver space enclosed by the main bracket and the bottom holder.

17. The linear light apparatus of claim 1, wherein the block plate is a made by folding an edge part of the bottom holder.

18. The linear light apparatus of claim 1, wherein the tilt surfaces have reflective layers for reflecting a light of the light strip to the light passing cover.

19. The linear light apparatus of claim 1, wherein the tilt surfaces are mounted with an additional light source, wherein the additional light source has a different optical parameter from the LED modules on the light strip.

20. The linear light apparatus of claim 1, wherein the bottom holder has an air flow channel for heat dissipation.

* * * * *